Figure 1:
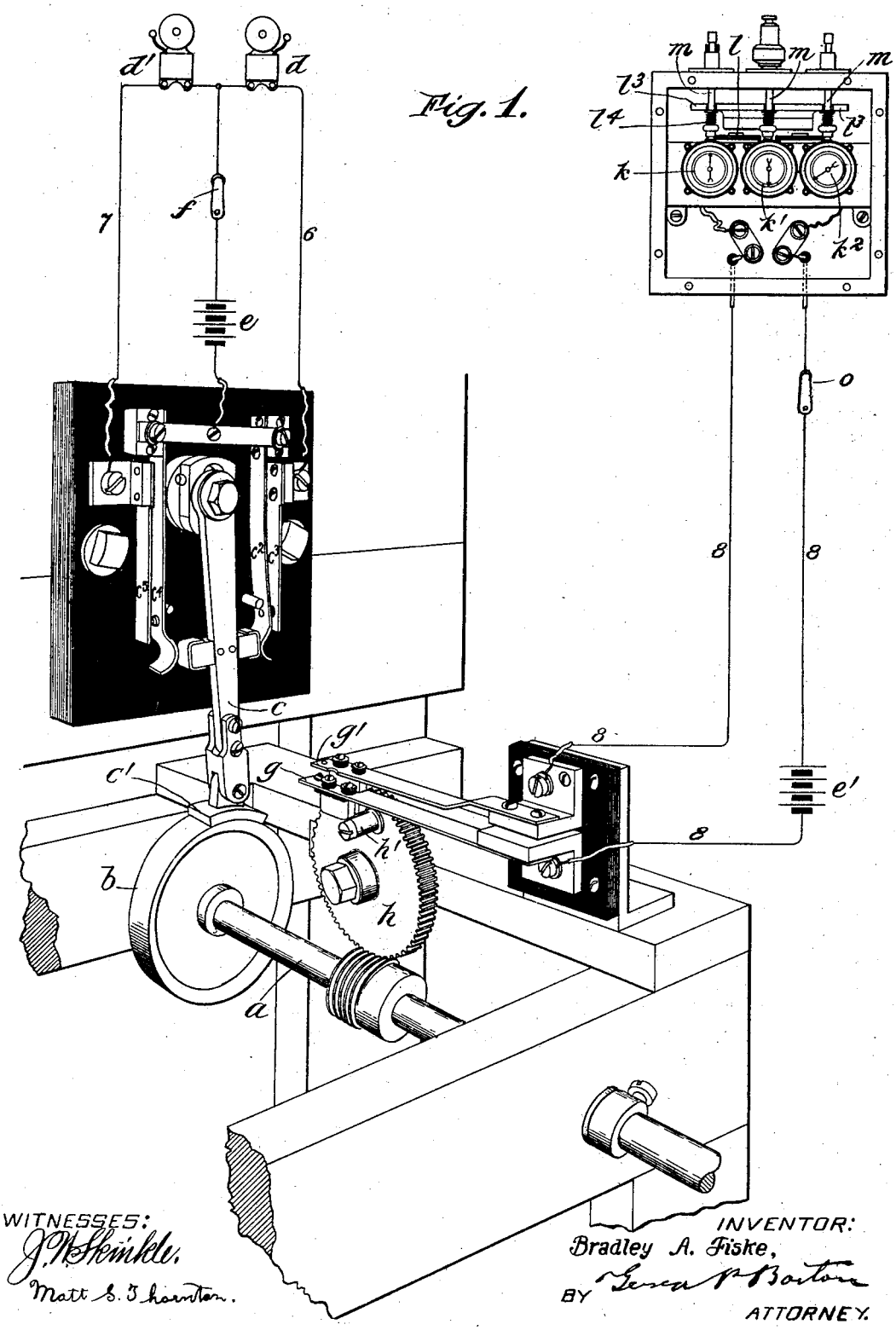

No. 740,547. PATENTED OCT. 6, 1903.
B. A. FISKE.
SPEED AND DIRECTION INDICATOR.
APPLICATION FILED JAN. 15, 1902.
NO MODEL. 2 SHEETS—SHEET 2.
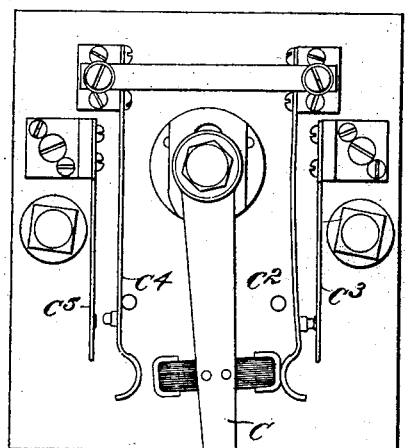
Fig. 2.
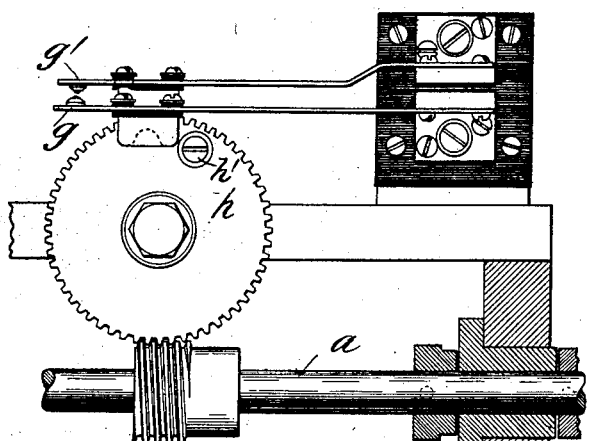
Fig. 3.
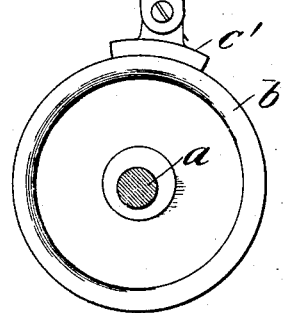
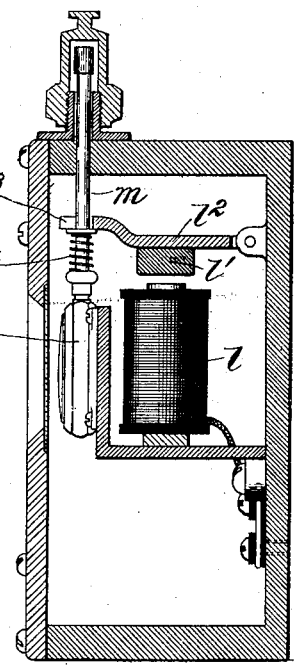
Fig. 4.
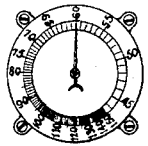
Fig. 5.
WITNESSES:
J. W. Hinkle.
Matt S. Thornton.
INVENTOR:
Bradley A. Fiske,
BY George P. Barton
ATTORNEY.

No. 740,547. Patented October 6, 1903.

UNITED STATES PATENT OFFICE.

BRADLEY A. FISKE, OF THE UNITED STATES NAVY, ASSIGNOR TO WESTERN ELECTRIC COMPANY, OF CHICAGO, ILLINOIS, A CORPORATION.

SPEED AND DIRECTION INDICATOR.

SPECIFICATION forming part of Letters Patent No. 740,547, dated October 6, 1903.

Application filed January 15, 1902. Serial No. 89,863. (No model.)

*To all whom it may concern:*

Be it known that I, BRADLEY A. FISKE, a lieutenant-commander in the United States Navy, residing at Brooklyn, Kings county, New York, have invented a certain new and useful Improvement in Speed and Direction Indicators, (Case No. 6,) of which the following is a full, clear, concise, and exact description.

My invention relates to a speed and direction indicator for ships; and its object is to provide audible and visible signal devices which may be placed at any desired point on the ship, whereby the speed and direction of rotation of the main engine-shaft may be known.

I will describe my invention by reference to the accompanying drawings, and the features or combinations which I regard as novel will be pointed out in the appended claims.

Figure 1 is a perspective view of the signal-transmitting mechanism with the circuits and signal-receiving device shown in diagram. Fig. 2 is a front view of the mechanism for transmitting the audible signals. Fig. 3 is a view in elevation of the mechanism for transmitting signals to the direct-reading speed-indicator. Fig. 4 is a vertical sectional view of the direct-reading speed-indicator. Fig. 5 is a front view of one of the dials thereof.

Similar characters of reference are used to designate the same parts wherever they are shown.

Referring first to the mechanism for transmitting audible signals, a disk or wheel $b$ is mounted eccentrically upon the counter-shaft $a$, which is intended to be geared to the main engine-shaft. The eccentricity may be very slight—say one-eighth of an inch. Immediately above the eccentric disk $b$ is mounted a lever $c$, pivoted at its upper end to a block which is capable of sliding vertically a short distance and having at its lower end a shoe $c'$, which is adapted to be engaged by the eccentric disk $b$. As the shaft rotates to the right or left the arm is moved to one side or the other at each revolution through the agency of the said eccentric. Contact-springs are mounted on either side of the lever $c$ to be operated thereby, each set of springs controlling a circuit which includes a bell or other signal-receiving device. Thus the pair of springs on the right in Fig. 1 controls the circuit 6 which includes the bell $d$, and the similar pair of springs on the left controls the circuit 7 which includes the bell $d'$. A battery or other suitable source of current $e$ is included in a conductor which is common to both circuits. When the counter-shaft $a$ is rotated to the right, the arm $c$ will be carried over to the right at each revolution and move the contact-spring $c^2$ into engagement with the spring $c^3$, closing the circuit 6 and ringing the bell $d$, and when the shaft is rotated to the left the arm $c$ will at each revolution move the contact-spring $c^4$ into engagement with the spring $c^5$ and close the circuit 7, ringing the bell $d'$.

The bells may be very different in tone and may be located at any convenient point—as, for example, on the bridge of the ship. The bells may be the regulation navy standard water-tight single-stroke bells. A switch $f$, placed conveniently near them, can be used to put them in or out of circuit, as desired. When the bells are in circuit, the officer of the deck can always tell from the tone of the bell that is ringing whether the engine is backing or going ahead. An approximate idea of the speed can also be obtained by noting the frequency of the bell-strokes. If the officer has the leisure to count the strokes of the bell for a minute, he can tell the speed to within one revolution.

Turning now to the direct-reading indicator, the transmitting device consists of a pair of springs $g$ $g'$, which control the circuit 8, said springs being adapted to be closed together by means of a pin $h'$, carried upon a worm-wheel $h$, which is geared to a worm on the counter-shaft. The contact-springs $g$ $g'$ carry downwardly-projecting studs of insulating material, which are arranged to ride upon the pin $h'$ as it passes under them. The studs are arranged so that as the steel pin passes under the contact-springs both of said springs are raised together and then the upper spring is afterward let fall on the lower one. To accomplish this, the stud carried by the upper spring is cut away on its lower edge, as shown in dotted lines in Fig.

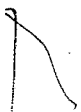

3. The pin $h'$ upon engaging the lugs carried by springs $g\ g'$ raises both simultaneously; but as said pin passes beneath the hollowed portion of the stud carried by the upper spring said spring is thus allowed to fall and momentarily close the circuit 8. Contact, therefore, is always made at exactly the same position of the worm-wheel regardless of the direction of rotation. The worm-wheel $h$ may be geared to the counter-shaft in such a way that said worm-wheel will make one revolution for every sixty revolutions of the shaft. The circuit 8 will therefore be closed once for every sixty revolutions of the shaft.

The direct-reading speed-indicator consists of three stop-watches $k\ k'\ k^2$, supported on a suitable mounting and arranged to be operated simultaneously by an electromagnet $l$, which is included in the circuit 8. The armature $l'$ of said magnet is mounted upon a pivoted lever $l^2$, which is provided with an extension $l^3$, adapted when the armature is excited to exert pressure upon the knobs of the three stop-watches through interposed springs $l^4$, said springs being for the purpose of reducing the shock to the watches. The stop-watches are mounted upon a bar of soft iron, which shields them from the magnet. A rod $m$, the lower end of which is secured to the knob of each stop-watch, extends upward through the case of the speed-indicator, so that the watch may be wound from outside the case. The extension $l^3$ of the armature-lever embraces the three shafts $m$, which pass through holes therein, and springs $l^4$ encircle the shafts $m\ m$ between the extension of the armature-lever and the knobs of the respective stop-watches. As is well understood, pressure upon the knob of a stop-watch does one of three things. It stops the watch-hand if the hand is turning, it returns the hand to zero if the hand is stopped at any other place than zero, and it releases the hand and starts it to rotating if said hand be stopped at zero. It makes no difference when the pressure on the knob ceases provided it ceases in time to give the next pressure. The three watches $k\ k'\ k^2$ are in different phases—that is, one watch-hand is stopped at zero, another watch-hand is in motion, and the third is stopped at the position where it was when the electromagnet-armature was last attracted. One of the three watches therefore always indicates the speed at which the shaft was running during the last sixty revolutions. Each time the shaft $a$ makes, say, sixty revolutions the worm-wheel $h$ revolves once and closes the circuit 8, and each time the circuit 8 is closed the magnet $l$ receives current, attracts its armature, and simultaneously actuates the three stop-watches. The hand of the watch which was previously stopped at zero is thus started and continues to rotate until the magnet is again attracted—that is, until the shaft $a$ has made another sixty revolutions. If the shaft is going one hundred and twenty revolutions per minute, the sixty revolutions would be made in thirty seconds. Therefore the thirty-second position on each watch is marked "120.". If the shaft were going at eighty revolutions per minute, the time required to make sixty revolutions would be forty-five seconds, and the forty-five-second mark on each watch is therefore marked "80." The dial may therefore be graduated, as shown in Fig. 5.

If the shaft were going exactly sixty revolutions per minute, the hand of the stop-watch would just complete one revolution during the sixty revolutions of the shaft, so that the zero position of the watch would be marked "60." The other graduations of the scale can be found in a similar manner. In case the hands of the stop-watch should get out of position they may be rectified by pushing in on the ends of the shafts $m\ m$, which project outside the case. The watches may also be wound as often as necessary by turning the said shafts $m$.

A switch $o$ may be provided in the circuit 8 by which the direct-reading speed-indicator may be cut out of circuit when desired.

To get the best practical results, the counter-shaft should be geared to rotate at the same speed as the main engine-shaft; but in the case of high-speed engines, such as those on torpedo-boats, the counter-shaft might be geared to run at a slower speed—say one to four. The direct-reading speed-indicator will give the best results if it be so connected with the main engine-shaft that at the average cruising speed the circuit 8 would be closed about once a minute.

It will be apparent that the ideas herein set forth may be embodied in apparatus differing to some extent from the precise form shown in the drawings, and I do not desire to be limited narrowly thereto; but, Having described my invention, I claim—

1. In a speed and direction indicator the combination with the continuously-rotating shaft $a$, of switch-contacts and mechanism operated by the rotation of the shaft in a given direction for periodically actuating said contacts, an electric circuit including a source of current, and a responsive device controlled by said contacts, other switch-contacts and mechanism operated by the shaft when rotating in an opposite direction for periodically actuating the last-mentioned contacts, and a circuit including a responsive device and source of current, controlled by the last-mentioned contacts, as set forth.

2. The combination with the shaft $a$ and the eccentric $b$ thereon, of the pivoted lever $c$, the shoe $c'$ carried by said lever and engaged by the eccentric $b$, whereby the lever is moved to one side or the other according to the direction of rotation of the shaft $a$ at each revolution thereof, and switch-contacts actuated by said lever as the same is moved to one side or the other.

3. In a speed-indicator, the combination with a series of stop-watches in different phases, an electromagnet and mechanism controlled by said magnet for simultaneously actuating said stop-watches, a circuit including the magnet with a source of current, switch-contacts controlling the circuit, and mechanism operated by the device whose speed is to be measured, for periodically actuating said switch-contacts.

4. In a speed-indicator, the combination with three stop-watches, the hand of one watch being at zero, the hand of the second being in motion, and the hand of the third being stopped preparatory to being moved back to zero, an electromagnet, and mechanism operated by said magnet for simultaneously actuating the three stop-watches, a circuit including said magnet, switch-contacts controlling the circuit, and mechanism operated by the rotation of the shaft whose speed is to be measured, for periodically actuating said switch-contacts, as described.

5. The combination with the shaft $a$ and the eccentric $b$ mounted thereon, of a pivoted lever $c$ carrying a shoe $c'$ adapted to be engaged by said eccentric, the pivoted end of the lever being arranged to slide in its mounting to and from the shaft, whereby as the shaft rotates the lever is swung on its pivot at each revolution, according to the direction of rotation of the shaft, switch-contacts actuated by the movement of the lever to one side, a circuit including a source of current, and a responsive device, such as a single-stroke bell, controlled by said switch-contacts, other contacts actuated by the movement of the lever to the other side, and a circuit including a source of current and another responsive device controlled by the last-mentioned contacts.

In witness whereof I hereunto subscribe my name this 12th day of November A. D. 1901.

BRADLEY A. FISKE.

Witnesses:
C. CAMPBELL,
H. F. WHITE.